(12) United States Patent
McGlasson et al.

(10) Patent No.: US 9,573,211 B2
(45) Date of Patent: Feb. 21, 2017

(54) ACTIVE TORQUE METHOD OF LAPPING GEARS

(71) Applicant: THE GLEASON WORKS, Rochester, NY (US)

(72) Inventors: William D. McGlasson, Caledonia, NY (US); Mark T. Strang, Macedon, NY (US)

(73) Assignee: THE GLEASON WORKS, Rochester, NY (US)

( * ) Notice: Subject to any disclaimer, the term of this patent is extended or adjusted under 35 U.S.C. 154(b) by 138 days.

(21) Appl. No.: 14/399,288

(22) PCT Filed: Jun. 19, 2013

(86) PCT No.: PCT/US2013/046498
§ 371 (c)(1),
(2) Date: Nov. 6, 2014

(87) PCT Pub. No.: WO2013/192280
PCT Pub. Date: Dec. 27, 2013

(65) Prior Publication Data
US 2015/0111470 A1    Apr. 23, 2015

Related U.S. Application Data

(60) Provisional application No. 61/661,382, filed on Jun. 19, 2012.

(51) Int. Cl.
| | | |
|---|---|---|
| B23F 23/12 | (2006.01) | |
| B24B 49/16 | (2006.01) | |
| B23F 19/02 | (2006.01) | |

(52) U.S. Cl.
CPC .......... B23F 23/1218 (2013.01); B23F 19/02 (2013.01); B23F 19/025 (2013.01); B24B 49/16 (2013.01)

(58) Field of Classification Search
CPC ........... B23F 1/02; B23F 19/02; B23F 19/025; B23F 19/04; B23F 19/045; B23F 19/12; B23F 23/1218; B24B 49/16
See application file for complete search history.

(56) References Cited

U.S. PATENT DOCUMENTS

| | | | |
|---|---|---|---|
| 4,788,476 A | 11/1988 | Ginier | |
| 5,191,739 A * | 3/1993 | Kondo | .................. B23F 23/006 451/114 |

(Continued)

FOREIGN PATENT DOCUMENTS

WO    2008/122772 A1    10/2008

OTHER PUBLICATIONS

Stadtfeld, Hermann J., "Phoenix 600HTL A New Dimension in Lapping of Bevel and Hypoid Gears", The Gleason Works, Aug. 1998, pp. 1-24.

(Continued)

*Primary Examiner* — Timothy V Eley
(74) *Attorney, Agent, or Firm* — Robert L. McDowell

(57) ABSTRACT

Method and apparatus for lapping gears which includes an active torque system to substantially improve the lapping process with respect to run-out and other longer-term motion transmission errors without compromising tooth-to-tooth performance. Motion transmission error measurements provide the basis for calculating a corrective active torque component which is combined with conventional process torque to reduce or eliminate part run-out.

16 Claims, 2 Drawing Sheets

(56) References Cited

U.S. PATENT DOCUMENTS

| | | |
|---|---|---|
| 6,120,355 A | 9/2000 | Stadtfeld et al. |
| 6,481,508 B2 | 11/2002 | McGlasson et al. |
| 2006/0073766 A1* | 4/2006 | McGlasson ............. B23F 19/02 451/5 |

OTHER PUBLICATIONS

International Search Report and Written Opinion for PCT/US2013/046498, received Nov. 12, 2013.

* cited by examiner

ACTIVE TORQUE METHOD OF LAPPING GEARS

This application claims the benefit of U.S. Provisional Patent Application No. 61/661,382 filed Jun. 19, 2012, the entire disclosure of which is hereby incorporated by reference.

FIELD OF THE INVENTION

The invention is directed to gear lapping and in particular to a gear lapping machine and method for actively controlling torque during the lapping process.

BACKGROUND OF THE INVENTION

Lapping is a well-established process for finishing the tooth surfaces of bevel gears. The purpose of lapping is to alter or refine gear tooth flanks to improve gearset running noise (motion transmission errors). These motion transmission errors can be characterized as short-term (once-per-tooth and harmonics thereof) and long-term (once-per-revolution run-out and harmonics thereof).

In the lapping process, members of a bevel gear set, namely a pinion and ring gear, are mounted to respective spindles in a lapping machine via appropriate workholding equipment. In most instances of rolling of the gear set during lapping, the pinion is the driving member and the ring gear is braked thereby creating an amount of torque between the pinion and ring gear. The gear members are rolled in mesh and lapping compound, which can be a mixture of oil (or water) and silicon carbide or similar abrasive, is sprayed, injected or poured into the meshing zone. In a typical lapping cycle, first one side of the gears (e.g. coast side) is lapped followed by lapping of the other side (e.g. drive side) of the gears. An example of a gear lapping machine can be found in U.S. Pat. No. 6,120,355 to Stadtfeld et al.

Most lapping machines have three degrees of freedom available for realizing relative motion between a ring gear and pinion. The first freedom being relative movement in the direction of the ring rear axis (gear cone distance) which shall be referred to as direction G or the G-axis, the second freedom being relative movement in direction of the pinion axis (pinion cone distance) which shall be referred to as direction H or the H-axis, and the third degree of freedom being distance between the ring gear and pinion axes which shall be referred to as direction V or the V-axis. The direction V is also known as the "hypoid offset" or "pinion offset."

In lapping processes, relative movement in the V, H and G directions effect positional changes in the contact pattern of the members of the gear set, in effect modifying the contact pattern. Lapping involves rotating the gear members in mesh with contact at a desired position on the tooth surfaces. Thus, the members are located at particular V and H positions along with a particular G-axis position to effect the desired backlash.

Typically, the V, H and G movements each have an effect on both the lengthwise and depthwise position of the localized tooth contact pattern, the primary effect of the V-axis movement being on the relative lengthwise position of the contact pattern, the primary effect of the H-axis movement being on the relative depthwise position of the contact pattern, and the primary effect of the G-axis movement being on the backlash.

As the gear set is lapped, contact is usually shifted smoothly and gradually from the center of the tooth toward one of the outer (heel) or inner (toe) portions of the tooth surface by changing the V and H settings as necessary to effect such a shifting of the contact position. As V and H are changed to effect the shifting, the G-axis position must also be changed smoothly and gradually to maintain the desired backlash. When the desired heel or toe position is reached, V and H axes positions are again changed to shift contact to the other of the heel or toe positions with the changing V and H positions being accompanied by an appropriate G-axis change to maintain backlash. The contact position is then returned to the beginning position at the center of the tooth.

Torque is developed by the machine spindle motors such that a desired speed and load are produced at the gearset, with material removal rate by abrasive action being a function of the load. The load, or gearset torque, may also have an average level determined by the user (e.g. 10 Newton-meters) when setting up the lapping job. This average torque level is maintained in-process by the machine according to various known methods, such as disclosed in U.S. Pat. No. 6,481,508 to McGlasson et al.

But the gearset torque also has dynamic components which are not actively controlled. Such dynamic components are unavoidably present as a result of machine response to gearset motion errors influenced by masses, stiffness and damping of the spindles and other machine elements (i.e. passive physics of the machine). These dynamic components, initiated primarily from the gearset motion errors, add to the average torque to comprise the actual lapping torque. Thus, at any given instant, the lapping torque may be substantially higher or lower than the commanded average value, based on these dynamics. The performance, and performance limitations, of a lapping machine is in large part dependent on these passive physics-based behaviors, and the faster the spindles are rotated during lapping, the more dominant these effects tend to become.

Therefore, significant limiting effects often arise from the passive dynamic motion/torque behavior of the lapping machine system. It has been found that lapping machine parameters (mechanical design, control characteristics and process choices) that produce the best tooth modification performance may not at the same time produce the best spacing and/or run-out performance, and vice versa. In other words, a machine design for optimal improvement in tooth flank shape may, on average, merely maintain or even make run-outs worse. And a machine designed to consistently improve part run-out may achieve sub-optimal tooth-to-tooth characteristics.

One example of addressing tooth characteristics can be found in U.S. Pat. No. 4,788,476 to Ginier where a method is disclosed for utilizing and manipulating the intermittent contact of an interference-based lapping approach (resulting from operating the two spindles in velocity and/or position modes) in order to selectively lap distorted or out-of-position gear teeth. Control of the process comes down to the timing of when to advance and when to maintain a commanded interference condition that is producing lapping torque. The resulting lapping cycle is generally too slow to be used in production and over-lapping of some teeth (rendering the gear set unusable) can be expected if pre-lapping spacing errors are significant.

SUMMARY OF THE INVENTION

The invention comprises a method and apparatus for lapping gears which includes an active torque system to substantially improve the lapping process with respect to run-out and other longer-term motion transmission errors without compromising tooth-to-tooth performance. Motion transmission error measurements provide the basis for calculating one or more corrective active torque components which are realized by a spindle motor or brake and are combined with conventional process torque to reduce or eliminate part run-out and other elements of gear set motion transmission error.

DETAILED DESCRIPTION OF THE PREFERRED EMBODIMENT

Figure 1:
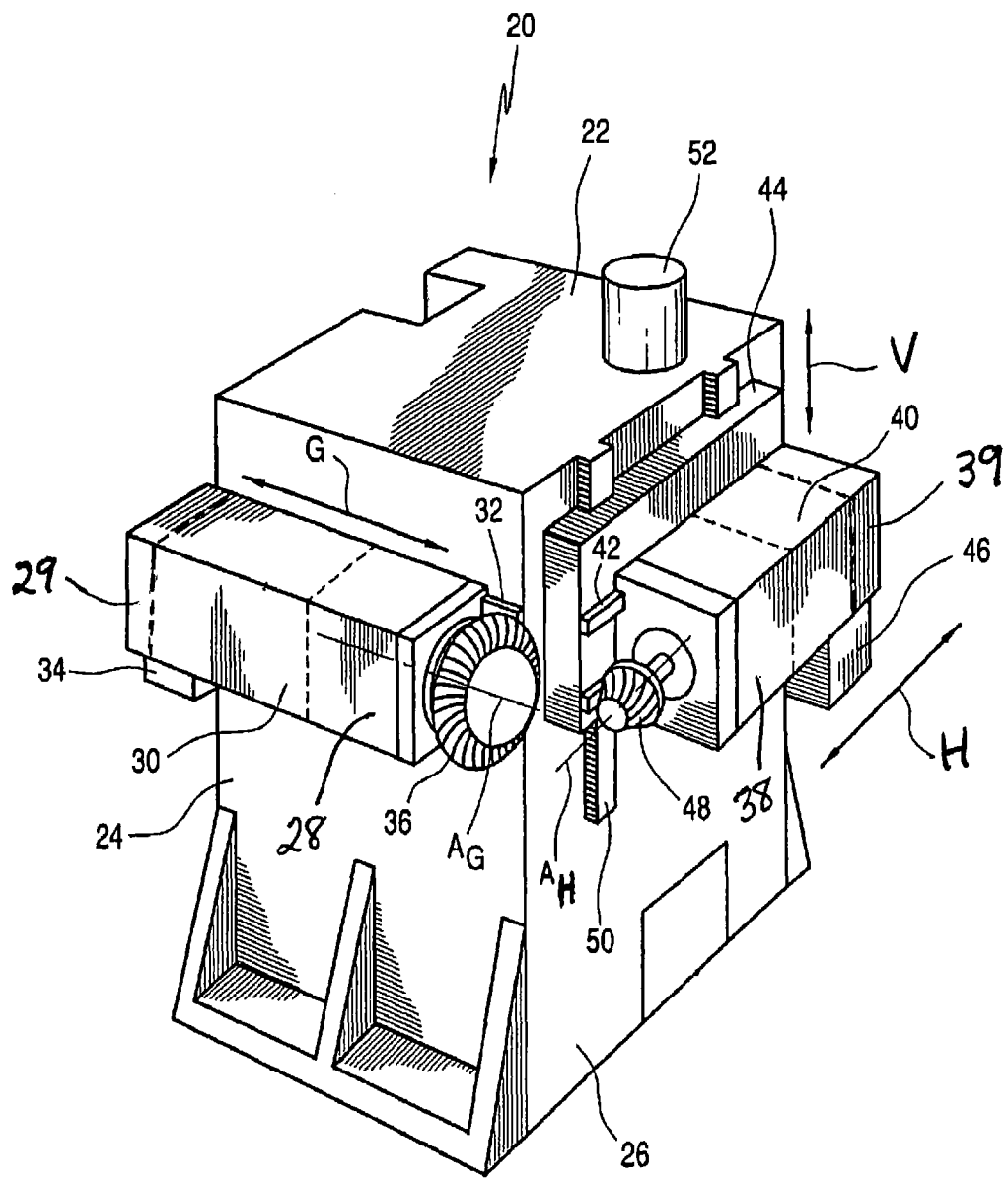
FIG. 1 illustrates a known configuration of a gear lapping machine.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from any machine drawings.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, the references are made relative to the drawings (as normally viewed) for convenience. These directions are not intended to be taken literally or limit the present invention in any form. In addition, terms such as "first", "second", "third", etc., are used herein for purposes of description and are not intended to indicate or imply importance or significance.

A lapping machine as in previously mentioned U.S. Pat. No. 6,120,355 is illustrated in FIG. 1 and designated generally by 20. For ease in viewing the various machine components, FIG. 1 illustrates the inventive machine without doors, supporting systems and exterior sheet metal. The machine 20 comprises a single column 22 that may also be thought of as the machine frame. Column 22 comprises at least three sides, preferably four sides, with at least two of the sides, first side 24 and second side 26, being perpendicular to one another. Each of the first and second sides comprises a width and a height (as viewed in FIG. 1).

First side 24 includes first workpiece spindle 28 which is rotatable about axis $A_G$ and is preferably driven by a direct drive motor 30, preferably liquid-cooled, mounted between front and rear spindle bearings (not shown). Spindle 28 is movable along the width of first side 24 in direction G on ways 32 attached directly to column 22. Movement of spindle 28 in direction G is provided by motor 34 through a direct-coupled ballscrew (not shown). Preferably, a bevel ring gear member 36 is releasably mounted to spindle 28 by suitable workholding equipment as is known in the art.

Second side 26 includes second workpiece spindle 38 which is rotatable about axis $A_H$ and is preferably driven by a direct drive motor 40, preferably liquid-cooled, mounted between front and rear spindle bearings (not shown) with motor 40 capable of attaining a pinion rotation of about 4000 RPM (the RPM of motor 30 would be: pinion RPM/ratio of the gear set).

Spindle 38 is movable along the width of second side 26 in direction H on ways 42 attached to slide 44. Movement of spindle 38 in direction H is provided by motor 46 through a direct-coupled ballscrew (not shown). Preferably, a pinion member 48 is releasably mounted to spindle 38 by suitable workholding equipment as is known in the art. Workpiece spindle 38 is also movable along the height of second side 26 in direction V since slide 44 is movable in the V direction via ways 50 with movement being provided by motor 52 through a direct-coupled ballscrew (not shown). Directions G, H and V are mutually perpendicular with respect to one another. For practical purposes as well as for purposes of illustration, in FIG. 1, the V direction is vertical.

Movement of first work spindle 28 in direction G, second work spindle 38 in direction H, slide 44 in direction V, as well as first spindle rotation and second spindle rotation, is imparted by the separate drive motors 34, 46, 52, 30 and 40 respectively. The above-named components are capable of independent movement with respect to one another or may move simultaneously with one another. Each of the respective motors is associated with a feedback device such as a linear or rotary encoder (for example, encoders 29, 39) as part of a CNC system which governs the operation of the drive motors in accordance with instructions input to a computer controller such as the Fanuc model 18i.

According to the invention, a lapping machine includes an active torque system to substantially improve the lapping process with respect to run-out and other longer-term motion errors without compromising short term tooth-to-tooth performance. The invention comprises a real-time motion-transmission-error (MTE) measurement system as part of the lapping machine, using this system to obtain a real-time measurement of run-out, and introducing an active corrective torque command component to reduce this run-out. Therefore, if machine passive physics produces dynamic torque components that tend to reinforce or increase run-out, then the active torque component(s) generated by the inventive system intend to counteract the passive component(s) in a controllable and corrective manner such that the net result is improvement or practical elimination of selected components of that run-out. For example, the net result for a given run-out component may be zero or a non-zero (e.g. positive) amount. Preferably, corrective torque components lap motion-error high spots harder than low spots, which over time tends to reduce those motion errors.

The invention includes on-machine measurement of gear-set motion errors. A computer-based data acquisition system collects rotational information from encoders mounted to the pinion and gear spindles. This data is processed to identify the motion error of the gearset and is preferably expressed as the magnitude and phase of many component frequencies. It should be noted that the determination of gearset motion transmission error (MTE), per se, is known to the artisan with respect to gear testing machines and testing methods. However, the inventors believe the incorporation of such MTE determination into a gear lapping process and machine has not been previously contemplated.

The determined motion transmission error measurement becomes the basis for calculating a corrective torque component at one or more of the frequencies of interest (e.g. once-per-revolution run-out or twice-per-revolution run-out) of the gear and/or pinion.

The invention further comprises determining an active torque signal from the calculated MTE components. In a preferred embodiment, an active torque signal is output to the NC control unit or drive for the main ring gear spindle motor, and the active torque signal is added to the command for torque already being generated for conventional spindle control. In another embodiment, the active torque signal is output to a drive serving an "active torque" motor separate from the main ring gear spindle motor, but also integrated into the ring gear spindle.

During the lapping process, the measured MTE can change for a variety of reasons. First, the MTE characteristics of the drive side can be different from those of the coast side, thus the active torque signal applied will depend on the side currently being lapped, which in a typical lapping cycle, comprises lapping one side then the other. Also, the MTE can change from the beginning to the end of the cycle because lapping is actively re-shaping the teeth throughout. Furthermore, the MTE can change as a function of tooth contact position. Tooth contact position is deliberately moved throughout the lapping process such that the lapping action, generally localized at any instant of time to just a portion of the tooth surface, will eventually cover the majority of the tooth flank. This contact pattern motion is achieved by making small and continuous adjustments to the relative positions of the two gearset members using the V, H and G axes of the machine. Therefore, for the above reasons, the active torque components required for corrective lapping are not static or constant, and must be updated at regular periods or intervals throughout the lapping cycle. To this end, the MTE system repeatedly makes measurements, analyzes error components, and calculates active torque commands. The period of this repeating cycle may be set to a value determined to be best for an application, for example between 1 and 20 seconds or part revolutions.

It should be noted that the workholding equipment that releasably clamps the gearset members to their respective spindles, and even the spindle itself, may be sources of run-out in addition to the gearset MTE errors. If these sources of error are significant and sufficiently repeatable, they can be determined before the commencement of lapping and taken into account when the corrective signals are generated. In other words, the contributions from these sources, if known, can be subtracted from the raw MTE signal, and the corrective torque signals can be constructed not to address the total combined run-out components but to address just the components attributable to the gearset.

Figure 2:
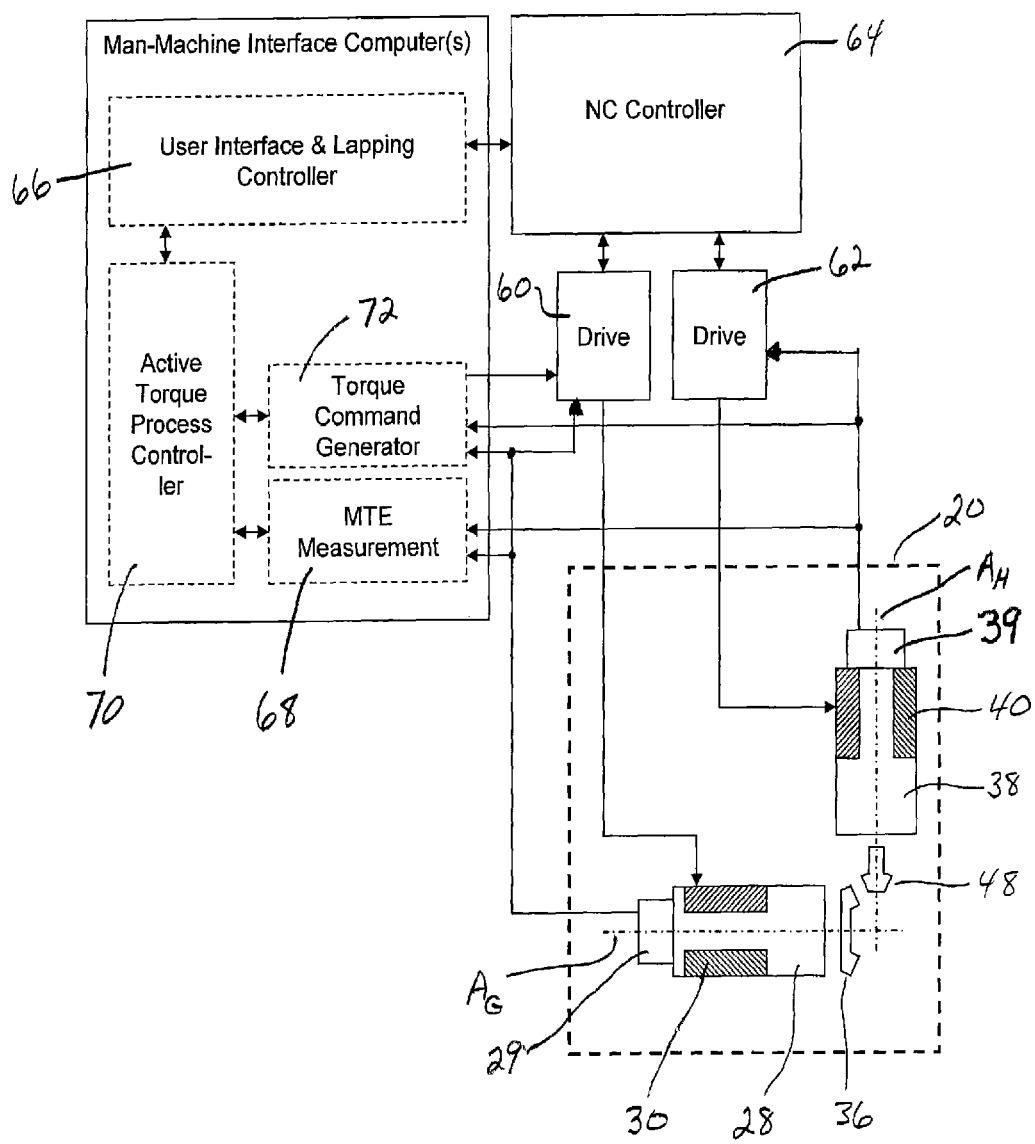
FIG. 2 diagrammatically illustrates an active torque system of a gear lapping machine.

FIG. 2 shows a preferred arrangement of a system for carrying out the inventive method. A gear lapping machine 20 (see FIG. 1) is shown wherein spindles 28, 38 are in communication with respective drives 60, 62 which in turn communicate with a numerical control (NC) controller 64. A user interface and lapping controller 66 is in communication with NC controller 64. As discussed above, a computer-based MTE measurement data acquisition system 68 collects rotational information from encoders 39, 29 mounted to the pinion and gear spindles 38 and 28 respectively. This data is processed to identify the motion transmission error of the gearset.

Within each of the periods or intervals mentioned above, the active torque signal is constructed by the torque command generator 72 based on parameters provided from logic and calculations of the active torque process controller 70. These parameters describe the one or more repeating components of the active torque signal, where each component is typically directed at a certain frequency of interest. For example, the active torque signal may be constructed of four components: one at the frequency of once per ring gear revolution, another at twice per ring gear revolution, another at once per pinion revolution, and the last at two times per pinion revolution.

Since the objective of the active torque signal is to provide torque of such nature as to improve (i.e. reduce) the gearset motion errors as the lapping process progresses, the components of the active torque signal are referred to as "corrective components." The parameters that define each corrective component describe its frequency, magnitude, phase, and shape. Preferably, each corrective component is of sinusoidal shape with its frequency, magnitude and phase being defined or calculated with respect to the parameters of measured MTE components. These corrective components are assembled and applied with respect to the current actual position of each gearset member thereby maintaining a gear-member-based spatial coordination between the MTE components and corrective components. While a sinusoidal shape of the corrective components is preferred, other shapes are likewise contemplated such as, for example, box shaped waves, square waves, triangle waves, etc.

The logic and calculations that lead to the parameters of corrective components can be based on various factors as can be appreciated by the artisan and may depend not just on measured MTE data but also on other considerations such as, for example, the speed of the process, the inertia of the gear set members and/or other rotating machine components, the size, type and nature of the gear set, the lapping machine model, etc. Moreover, the logic or calculations may depend as well on other on-machine measurements such as vibration, temperature, lapping compound, flow rate, etc. For example, the logic may call for a pinion-member corrective component to be a sinusoid related in magnitude to the pinion MTE component at the same frequency by a relationship of 1 N-m per 20 μrad (micro radians) and at relative phasing of 20 degrees advanced.

The active torque process controller 70 is directed by the user and/or programmed to decide which components of the MTE data are to be corrected. Its logic and calculations establish the parameters of the appropriate corrective components based on the aforementioned input parameters which include, for example, ring gear or pinion, frequency of once or twice per revolution, magnitude, phase angle and update cycle. The parameters of the corrective components are then sent to the torque command generator 72 where a corrective torque signal is generated and sent to ring gear drive 60 where it is added to the normal programmed spindle control torque coming from the NC controller 64. Alternatively, corrective torque signals may be sent to pinion drive 62 or coordinated torque signals may be sent to both drives 60, 62 simultaneously. It should also be noted that corrective torque signals may be sent to an active torque drive and motor separate from the main gear spindle motor (or main pinion spindle motor) but integrated into the gear spindle (or pinion spindle).

A particular set of corrective torque parameters is used by torque command generator 72 to construct an active torque command signal which is continually sent to drive 60 until an updated set of corrective torque parameters is established by the active torque process controller 70 based on updated measurement data received from the MTE measurement data acquisition system 68 and encoders 39, 29. The update interval may be any time period or interval but is preferably in the range of 1 to 20 seconds.

While the invention has been discussed with respect to the lapping machine configuration of FIG. 1, the inventive active torque system is also applicable to other types of lapping machines including, for example, angular lappers, swing pinion cone lappers and lapping machines having non-direct drive spindles.

While measurement data acquisition system 68, active torque process controller 70 and torque command generator 72 are represented in FIG. 2 as being separate entities, these functions may be combined into a single active torque process controller which itself may be part of the lapper controller 66. Alternatively, measurement data acquisition system 68, active torque process controller 70 and torque command generator 72 may each reside in a separate computer or other electronic devices. It should also be understood that in the present invention, use of the term "frequency" is intended to encompass both time-based frequencies and spatial frequencies (the term "spatial" referring to rotational positions of either or both of the gear set members).

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of lapping gears comprising rolling a first member of a gear set together in mesh with a second member of the gear set with an amount of torque between said first and second members while applying an abrasive mixture to the gear set members, said method further comprising:
   measuring motion-transmission-error of the gear-set in real time,
   obtaining a real-time measurement of run-out from the measured motion-transmission-error,
   determining a corrective torque component at one or more predetermined frequencies,
   introducing the corrective torque component for reducing the run-out, wherein the corrective torque component is introduced in phase with the rolling gear set,
   lapping said gear set with a torque defined by said amount of torque adjusted in accordance with said corrective torque component.

2. The method of claim 1 wherein each of said gear set members comprises teeth having a drive side and a coast side and wherein said lapping method is applied to one of said drive side and said coast side of said teeth and then applied to the other of said drive side and said coast side of said teeth.

3. The method of claim 1 wherein said real-time measurement of run-out excludes run-out due to workholding equipment releasably clamping the gear set.

4. The method of claim 1 wherein each of said first and second gear set members comprises teeth having tooth surfaces which contact one another at a tooth surface contact position during said lapping and wherein said tooth surface contact position is moved to a plurality of locations on the tooth surfaces during said lapping,
   said steps of measuring, obtaining, determining and introducing being repeated for each of said plurality of locations of the tooth surface contact position.

5. The method of claim 1 wherein the steps of measuring, obtaining, determining and introducing are repeated at intervals between 1 and 20 seconds.

6. The method of claim 1 wherein said motion-transmission-error is expressed as magnitude and phase of one or more component frequencies.

7. A method of lapping gears on a gear lapping machine comprising a first spindle and a second spindle with a first member of a gear set mounted for rotation to said first spindle and a second member of the gearset mounted for rotation to said second spindle, said method comprising:
   rolling said first member of the gear set together in mesh with said second member of the gear set with an initial amount of torque between said first and second members while applying an abrasive mixture to the gear set members,
   measuring motion-transmission-error of the gear-set in real time,
   obtaining a real-time measurement of run-out from the measured motion-transmission-error,
   determining a corrective torque component at one or more predetermined frequencies, wherein said frequencies comprise at least one of a time-based frequency and a spatial frequency,
   adding the corrective torque component to the initial amount of torque to produce a corrected amount of torque for reducing the run-out,
   lapping said gear set members with said corrected amount of torque.

8. The method of claim 7 wherein said first spindle is rotatable by a first spindle motor and said second spindle is rotatable by a second spindle motor and wherein said initial amount of torque is produced by one of said first and second motors,
   said corrective torque component being applied to at least one of said first and second motors.

9. The method of claim 7 wherein said first spindle is rotatable by a first spindle motor and said second spindle is rotatable by a second spindle motor and wherein said initial amount of torque is produced by one of said first and second motors,
   said corrective torque component being provided to a separate motor which is integrated into the one of said first and second spindles producing said initial torque.

10. The method of claim 7 wherein the steps of measuring, obtaining, determining and adding are repeated at predetermined intervals.

11. The method of claim 10 wherein said intervals are between 1 and 20 seconds.

12. The method of claim 7 wherein said frequencies being at least one of once per revolution of the first member, twice per revolution of the first member, once per revolution of the second member, and two times per revolution of the second member.

13. A gear lapping machine comprising a computer control, a first spindle rotatable about a first axis via a first spindle motor and a second spindle rotatable about a second spindle axis via a second spindle motor, said first motor being in communication with said computer control and said second motor being in communication with said computer control, said first spindle motor and said second spindle motor being operable to rotate a first member of a gear set mounted in said first spindle and a second member of said gear set mounted in said second spindle in mesh with a predetermined amount of torque between said gear set members, said machine further comprising:
- a motion-transmission-error measurement data acquisition system for determining run-out of said gear set, said system communicating with said first and second spindles,
- a torque command generator communicating with at least one of said first and second spindles,
- an active torque process controller communicating with said motion-transmission-error measurement data acquisition system and said torque command generator, said active torque process controller providing parameters to said torque command generator based on the measured run-out for determination of a corrective torque signal, said corrective torque signal comprising one or more corrective torque components at one or more predetermined frequencies, wherein said frequencies comprise at least one of a time-based frequency and a spatial frequency,
- whereby said torque command generator provides said corrective torque signal for addition to said predetermined amount of torque resulting in a corrected amount of torque for reducing run-out of the gear set.

14. The gear lapping machine of claim 13 wherein each of said motion-transmission-error measurement data acquisition system, said active torque process controller and said torque command generator resides in a separate device.

15. The gear lapping machine of claim 13 wherein said motion-transmission-error measurement data acquisition system, said active torque process controller and said torque command generator all reside in a single device.

16. A method of lapping gears comprising rolling a first member of a gear set together in mesh with a second member of the gear set with an amount of torque between said first and second members while applying an abrasive mixture to the gear set members, said method further comprising:
- measuring motion-transmission-error of the gear-set in real time,
- obtaining a real-time measurement of run-out from the measured motion-transmission-error,
- determining a corrective torque component at one or more predetermined frequencies,
- introducing the corrective torque component for reducing the run-out, wherein the corrective torque component is introduced out-of-phase with the rolling gear set,
- lapping said gear set with a torque defined by said amount of torque adjusted in accordance with said corrective torque component.

* * * * *